(12) United States Patent
Kitamura

(10) Patent No.: US 10,489,322 B2
(45) Date of Patent: Nov. 26, 2019

(54) APPARATUS AND METHOD TO IMPROVE PERFORMANCE IN DMA TRANSFER OF DATA

(71) Applicant: FUJITSU LIMITED, Kawasaki-shi, Kanagawa (JP)

(72) Inventor: Yasuhiro Kitamura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/296,946

(22) Filed: Mar. 8, 2019

(65) Prior Publication Data

US 2019/0286589 A1    Sep. 19, 2019

(30) Foreign Application Priority Data

Mar. 13, 2018 (JP) ................. 2018-046002

(51) Int. Cl.
    *G06F 9/54*      (2006.01)
    *G06F 13/28*      (2006.01)
    *G06F 3/06*      (2006.01)

(52) U.S. Cl.
CPC .......... *G06F 13/28* (2013.01); *G06F 3/0611* (2013.01); *G06F 3/0658* (2013.01); *G06F 3/0673* (2013.01); *G06F 2213/0064* (2013.01); *G06F 2213/16* (2013.01); *G06F 2213/28* (2013.01)

(58) Field of Classification Search
None
See application file for complete search history.

(56) References Cited

U.S. PATENT DOCUMENTS

| | | | |
|---|---|---|---|
| 2004/0015598 A1* | 1/2004 | Lin | H04L 49/90 709/232 |
| 2009/0031325 A1* | 1/2009 | Archer | G06F 9/544 719/315 |
| 2010/0202464 A1* | 8/2010 | Lu | H04L 49/90 370/400 |
| 2010/0296518 A1* | 11/2010 | Cardona | H04L 49/90 370/412 |
| 2019/0087218 A1* | 3/2019 | Loftus | G06F 9/45558 |

FOREIGN PATENT DOCUMENTS

| | | |
|---|---|---|
| JP | 11-146019 | 5/1999 |
| JP | 2000-092066 | 3/2000 |

* cited by examiner

*Primary Examiner* — Hyun Nam
(74) *Attorney, Agent, or Firm* — Fujitsu Patent Center

(57) ABSTRACT

An apparatus includes a first memory and a direct memory access (DMA) controller. The DMA controller includes a second memory to store the received packet and a third memory, and receives a packet including a header where information for DMA is registered and data to be stored in the first memory. The DMA controller acquires and stores, in the third memory, the header and a beginning portion of a given length from beginning of the data of the packet stored in the second memory. The DMA controller reads the data included in the packet from the third memory when it is determined, based on the header, that a data length of the data included in the packet is less than or equal to the given length, and performs storage of the read data by DMA in the first memory.

10 Claims, 17 Drawing Sheets

FIG. 4

| CYCLE | 7 | 6 | 5 | 4 | 3 | 2 | 1 | 0 |
|---|---|---|---|---|---|---|---|---|
| | | | | Byte | | | | |
| 1 | PAYLOAD LENGTH | COMMAND | | | MEMORY ADDRESS | | | |
| 2 | | | | | PAYLOAD | | | |
| 3 | | | | | ... | | | |
| ... | | | | | ... | | | |
| END | | | | | ... | | | |

| PACKET BUFFER | |
|---|---|
| ADDRESS | STORED DATA |
| 0 | HEADER A |
| 1 | PAYLOAD A |
| 2 | ... |
| 3 | ... |
| 4 | ... |
| 5 | ... |
| 6 | ... |
| 7 | ... |
| 8 | HEADER B |
| 9 | PAYLOAD B |
| 10 | ... |
| 11 | ... |
| 12 | ... |
| 13 | ... |
| 14 | ... |
| 15 | ... |
| 16 | ... |
| 17 | ... |
| 18 | ... |
| 19 | ... |
| 20 | ... |
| 21 | ... |
| 22 | ... |
| 23 | HEADER C |
| 24 | PAYLOAD C |
| 25 | ... |
| 26 | ... |
| 27 | ... |
| 28 | ... |
| ... | ... |

FIG. 11

| CYCLE | Byte | | | | | | | |
|---|---|---|---|---|---|---|---|---|
| | 7 | 6 | 5 | 4 | 3 | 2 | 1 | 0 |
| 1 | | | | | PAYLOAD | | | |
| 2 | | | | | ... | | | |
| 3 | | | | | ... | | | |
| ... | | | | | | | | |
| 8 | | | | | ... | | | |

205

APPARATUS AND METHOD TO IMPROVE PERFORMANCE IN DMA TRANSFER OF DATA

CROSS-REFERENCE TO RELATED APPLICATION

This application is based upon and claims the benefit of priority of the prior Japanese Patent Application No. 2018-46002, filed on Mar. 13, 2018, the entire contents of which are incorporated herein by reference.

FIELD

The embodiments discussed herein are related to apparatus and method to improve performance in direct memory access (DMA) transfer of data.

BACKGROUND

Among parallel computers, there is a device including a plurality of computers called compute nodes. In such a parallel computer including a plurality of compute nodes, data is transferred in some cases between compute nodes through direct memory access (DMA). In such cases, each compute node includes a DMA controller.

The DMA controller in a compute node, which functions as the data receiver, receives data transferred as packets via an input/output (I/O) controller from a compute node, which functions as the data transmitter. Next, the DMA controller stores the received data in a receive buffer. The DMA controller then writes the payload portion of the data, which has been stored in the receive buffer by DMA, to a memory.

In order to transfer payloads with long message lengths at high throughput by DMA, a receive buffer for storing a large amount of payloads is to be implemented, which leads to an increase in resources provided in an information processing apparatus. Such an increase in resources leads to suppressing space saving and an increase in manufacturing costs of the information processing apparatus.

Accordingly, to suppress an increase in resources while improving throughput, a high-density buffer, such as static random access memory (SRAM), is often used as a receive buffer of a DMA controller. For the purpose of improving the throughput of data transfer by DMA, the DMA controller uses a high-density receive buffer, such as SRAM, to store a large amount of packets. Storing a large amount of packets in a receive buffer enables the DMA controller to reduce waiting for transmission of packets at the transmitter end, and successively writing data retained in the receive buffer to a memory improves the throughput of data transfer. However, typically, access to SRAM has a long latency as compared with access to a usual receive buffer of flip-flops and the like.

As a technique for effectively making use of a receive buffer in data transfer by DMA as mentioned, there is an existing technique that provides different receive buffers for variable-length packets and for fixed-length packets. There is another existing technique that provides a plurality of per-destination receive buffers and in which when transfer conditions are satisfied in a receive buffer, data in the receive buffer is transferred to a memory by DMA.

Related art techniques are disclosed, for example, in Japanese Laid-open Patent Publication No. 11-146019 and Japanese Laid-open Patent Publication No. 2000-92066.

SUMMARY

According to an aspect of the embodiments, an apparatus includes a first memory and a direct memory access (DMA) controller. The DMA controller includes a second memory to store the received packet and a third memory, and receives a packet including a header where information for DMA is registered and data to be stored in the first memory. The DMA controller acquires and stores, in the third memory, the header and a beginning portion of a given length from beginning of the data of the packet stored in the second memory. The DMA controller reads the data included in the packet from the third memory when it is determined, based on the header, that a data length of the data included in the packet is less than or equal to the given length, and performs storage of the read data by DMA in the first memory.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating a format of a packet that is received;

FIG. 5 is a diagram illustrating an example of a storage state of packets in a packet buffer;

FIG. 11 is a diagram illustrating an example of a format of a data bus block;

DESCRIPTION OF EMBODIMENTS

Figure 1:
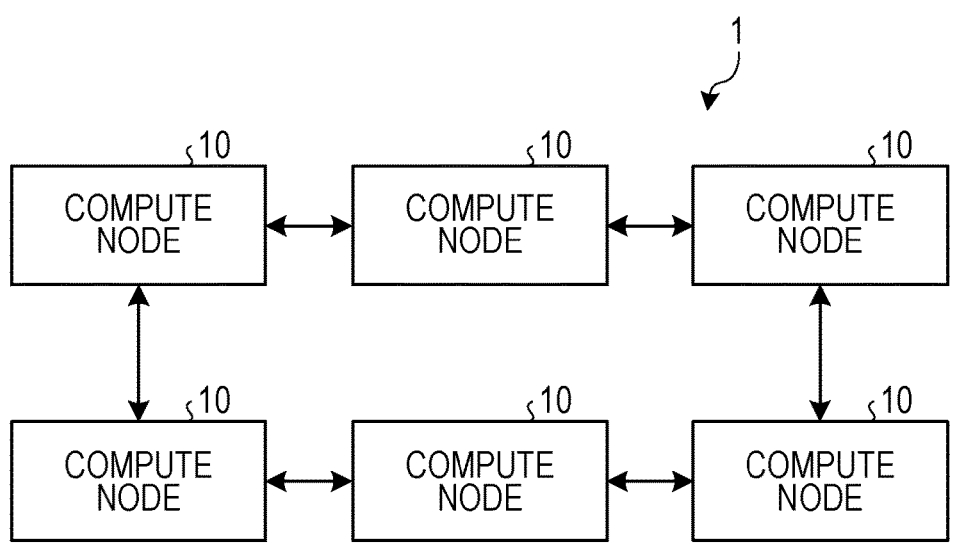
FIG. 1 is a diagram of a schematic configuration of a parallel computer.

With the existing techniques in which packets are stored in receive buffers and data transfer is performed by DMA, a DMA controller reads control information from the receive buffer and performs, for example, analysis of addresses for the read control information. The DMA controller then uses an analysis result to transfer a payload stored in the receive buffer to a memory. In this case, since the DMA controller accesses the receive buffer twice, the latency in data transfer by DMA increases.

When data having a long message length is transferred by DMA, existing data transfer by DMA is desirable in order to improve the throughput. By contrast, depending on how data transfer by DMA is applied, there are some cases where it is desired that a small payload be transferred with low latency. For example, it is considered that, by using a short message service (SMS) message, a data transmission source is notified of completion of memory access at the destination of data transfer by DMA. In such a case, placing a higher priority on reducing the latency for a short payload leads to performance improvement. However, with the existing techniques, access is made twice even for a short payload, and therefore an increase in latency is inevitable, making it difficult to improve the performance in data transfer by DMA.

With the existing technique that manages received packets so as to classify the packets by payload length, the number of outstanding packets of an I/O controller is determined depending on the amount of resources of a receive buffer designated for a short payload length. For example, if a packet with a short payload length occurs frequently, a receive buffer for variable-length packets is vacant while a receive buffer for fixed-length packets becomes full. This causes a situation where the I/O controller is unable to perform processing. This situation is disadvantageous when high throughput in data transfer by DMA is desired. To avoid the situation, the amount of resources of the receive buffer for fixed-length packets will be increased. As described above, even by using the existing technique that manages received packets so as to classify the packets by payload length, it is difficult to suppress an increase in the amount of resources to improve the performance in data transfer by DMA.

Furthermore, even by using a similar existing technique, access to a receive buffer is made twice, for reading a header and for reading a payload, and therefore the latency does not improve, making it difficult to improve the performance in data transfer by DMA.

In addition, even by using the existing technique in which data is transferred to a memory when transfer conditions are satisfied in each per-destination receive buffer, it is similarly difficult to suppress an increase in the amount of resources and to improve the performance in data transfer by DMA.

It is preferable to improve the performance in data transfer by DMA.

Hereinafter, an embodiment of an information processing apparatus, an information processing system, and a method for controlling an information processing apparatus will be described in detail with reference to the accompanying drawings. The embodiment described hereinafter is in no way intended to limit an information processing apparatus, an information processing system, and a method for controlling an information processing apparatus disclosed in the present application.

Embodiment

FIG. 1 is a diagram illustrating a schematic configuration of a parallel computer. A plurality of compute nodes 10 are coupled to a parallel computer 1, which is an information processing system. The compute node 10 is, for example, an information processing apparatus such as a server computer.

The compute nodes 10 communicate with each other. For example, the compute nodes 10 send and receive packets to transfer data to each other.

Although the case where six compute nodes 10 are coupled is illustrated by way of example in FIG. 1, the number of compute nodes 10 is not limited. The method for coupling the compute nodes 10 is not limited.

Figure 2:
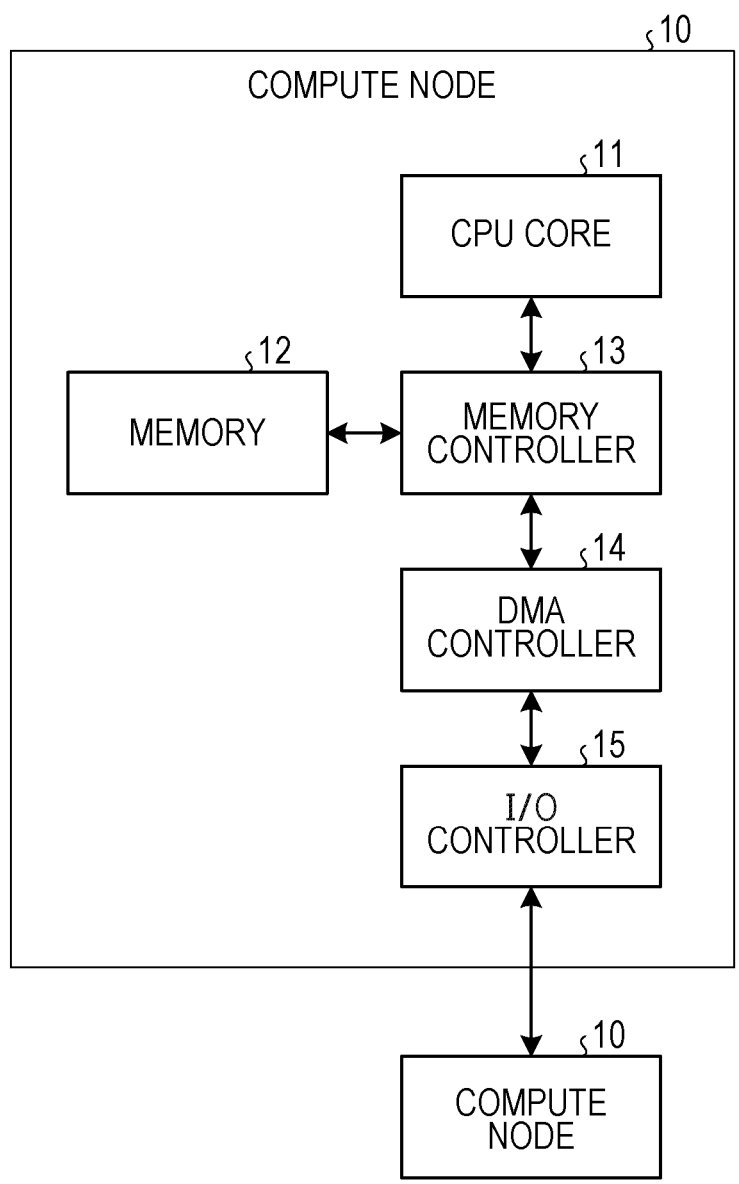
FIG. 2 is a diagram of a hardware configuration of a compute node.

FIG. 2 is a diagram of a hardware configuration of a compute node. The compute node 10 includes a central processing unit (CPU) core 11, a memory 12, a memory controller 13, a DMA controller 14, and an I/O controller 15.

The CPU core 11 is a processing unit. The CPU core 11 performs processing by using data stored in the memory 12. For example, the CPU core 11 performs operations by using data for the operations. The CPU core 11 acquires an SMS message stored in the memory 12 and performs processing in accordance with the acquired SMS message. For example, the CPU core 11 acquires, from the memory 12, an SMS message providing notification of completion of memory access. The CPU core 11 then confirms completion of processing of memory access. Furthermore, when writing of data to the memory 12 by DMA is complete, the CPU core 11 receives notification of completion of DMA from a header control unit 145.

The memory controller 13 receives, from the DMA controller 14, an instruction to store data in the memory 12. Then, by using a byte mask the notification of which has been provided, the memory controller 13 stores data in memory access units in the memory 12. The memory controller 13 receives, from the DMA controller 14, an instruction to read data from the memory 12. Then, according to the instruction, the memory controller 13 reads data in memory access units from the memory 12 and outputs the read data to the DMA controller 14. Upon completing writing or reading all the payloads to or from the memory 12, the memory controller 13 notifies the header control unit 145 of completion of memory access.

The memory controller 13 receives, from the CPU core 11, a command to acquire data. The memory controller 13 then reads the data indicated by the command from the memory 12 to output the data to the CPU core 11.

The memory 12 is, for example, synchronous dynamic random access memory (SDRAM) or the like.

The DMA controller 14 receives, from the I/O controller 15, a packet that has been received from another compute node 10 by DMA. The DMA controller 14 then stores data included in the acquired packet in the memory 12. The storage of data in the memory 12 by the DMA controller 14 will be described in detail hereinbelow.

The DMA controller 14 instructs the memory controller 13 to read data for data transfer by DMA. Thereafter, the DMA controller 14 acquires the data for data transfer by DMA from the memory controller 13. The DMA controller 14 then outputs the acquired data to the I/O controller 15 which transmits the data to another computer node 10.

Upon receiving data transferred by DMA from another compute node 10, the I/O controller 15 outputs the received data to the DMA controller 14. On the other hand, upon receiving, from the DMA controller 14, data to be subjected to data transfer by DMA, the I/O controller 15 transmits the received data to the compute node 10 that is the destination of data transfer by DMA.

Figure 3:
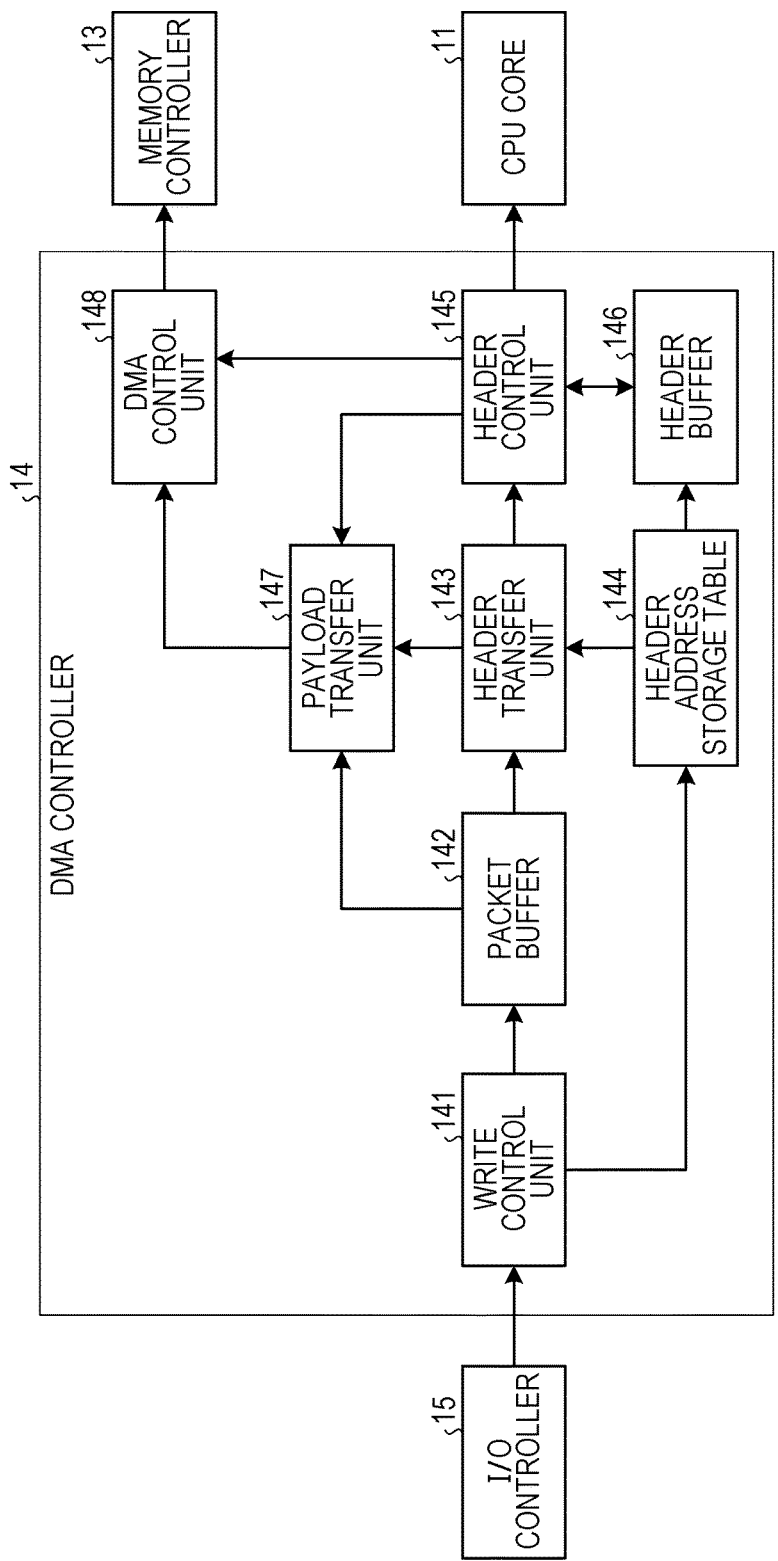
FIG. 3 is a block diagram of a DMA controller.

Next, with reference to FIG. 3, operations of data storage of the DMA controller 14 in the memory 12 will be described. FIG. 3 is a block diagram of a DMA controller. The DMA controller 14 includes a write control unit 141, a packet buffer 142, a header transfer unit 143, a header address storage table 144, the header control unit 145, a header buffer 146, a payload transfer unit 147, and a DMA control unit 148.

The packet buffer 142 may be a high-density memory, for example, such as SDRAM. The packet buffer 142 corresponds to an example of a packet storage unit.

The write control unit 141 determines whether there is space in the packet buffer 142. If there is no space in the packet buffer 142, the write control unit 141 refuses to receive a packet from the I/O controller 15.

If there is space in the packet buffer 142, the write control unit 141 receives, from the I/O controller 15, a packet having a header in which DMA information is contained. The DMA information, as used herein, is information for data transfer by DMA and includes a payload length, a command type, the first physical address of physical addresses to which access is to be made, and so on.

FIG. 4 is a diagram illustrating a format of a packet that is received. As illustrated in a format 201, in the present embodiment, a description is given of the case where 8 bytes of data are manipulated in a cycle. In the format 201, a header storage area is in the first cycle. The header storage area includes subareas of a payload length, a command, and a memory address. The term payload, as used herein, is data to be actually transferred. In the payload length subarea, the length of a payload is stored. In the command subarea, the type of command is stored. Examples of the type of command include writing of a payload to the memory 12 and reading a payload from the memory 12. In the memory address subarea, the first physical address of physical addresses to which access is to be made is stored.

The format 201 includes payload areas in the second and subsequent cycles. A payload is stored when being written to the memory 12. The size of a payload is variable, 8 bytes or less in some cases and greater than 8 bytes in other cases. For example, an SMS message often has a size less than or equal to 8 bytes.

Referring back to FIG. 3, description will be continued. The write control unit 141 writes a packet acquired from the I/O controller 15 to the packet buffer 142. If there is space in the packet buffer 142, the write control unit 141 sequentially receives packets from the I/O controller 15 and writes the packets to the packet buffer 142.

FIG. 5 is a diagram illustrating an example of a storage state of packets in a packet buffer. In FIG. 5, the storage state of packets in the packet buffer 142 is schematically illustrated. The packet buffer 142 has an address corresponding to each storage area. Data is stored in each storage area having an address. For example, in FIG. 5, in a storage area with an address of zero, a header A of data A, which includes the header A and a payload A, is stored. In areas with addresses of one to eight of the packet buffer 142, the payload A of the data A is stored. The write control unit 141 possesses a write address that corresponds to the first address of addresses to which a received packet is to be written. The write control unit 141 begins to store the received packet starting at the possessed write address, and while adding an address, the write control unit 141 stores the received packet in the packet buffer 142. At completion, the write control unit 141 possesses a write address for the beginning of the next packet.

Next, the write control unit 141 identifies the address of the header of the packet stored in the packet buffer 142. The write control unit 141 notifies the header transfer unit 143 of the identified header address. The write control unit 141 then writes, to the header address storage table 144, the header address of which the header transfer unit 143 is notified.

Figure 6:
FIG. 6 is a diagram illustrating an example of a header address storage table.

FIG. 6 is a diagram illustrating an example of a header address storage table. As described above, after storing a packet in the packet buffer 142, the write control unit 141 possesses a write address for the next packet. Since the header is at the beginning of a packet, the header address matches the first address of addresses where the packet is stored. Thus, the write control unit 141 identifies, as a write address for a packet, the first address of addresses where the packet is stored, and writes the identified write address to the header address storage table 144. Thus, the header addresses of packets stored in the packet buffer 142 are sequentially stored in the header address storage table 144. The write control unit 141 corresponds to an example of a receiving unit.

By referencing the header address storage table 144, the header transfer unit 143 determines whether there is a header of which the header control unit 145 has not been notified. If there is a header the notification of which has not been issued, the header transfer unit 143 determines whether there is a header that is being handled by the header control unit 145. For example, the header transfer unit 143 stores therein a header notification number representing that the header control unit 145 is notified of a header. If the header notification number is zero, the header transfer unit 143 determines that there is no header that is being handled by the header control unit 145.

If there is a header that is being handled by the header control unit 145, the header transfer unit 143 waits until there remains no header that is being handled by the header control unit 145. However, if there is no header that is being handled by the header control unit 145, the header transfer unit 143 acquires, from the header address storage table 144, a write address corresponding to a header the notification of which has not been issued. The header transfer unit 143 then sets the acquired write address as a read address of the packet buffer 142.

Next, the header transfer unit 143 reads a header from the read address set in the packet buffer 142 and reads data for one entry following the header from the packet buffer 142. The data for one entry in the packet buffer 142, as used herein, corresponds to an amount of data that is stored in the packet buffer 142 in one cycle during data storage. Hereinafter, data for one entry following the header is called a payload start portion. In the present embodiment, eight-byte sized data is handled in one cycle, and therefore the header transfer unit 143 acquires, as the payload start portion, 8 bytes of data from the beginning of the payload.

Figure 7:
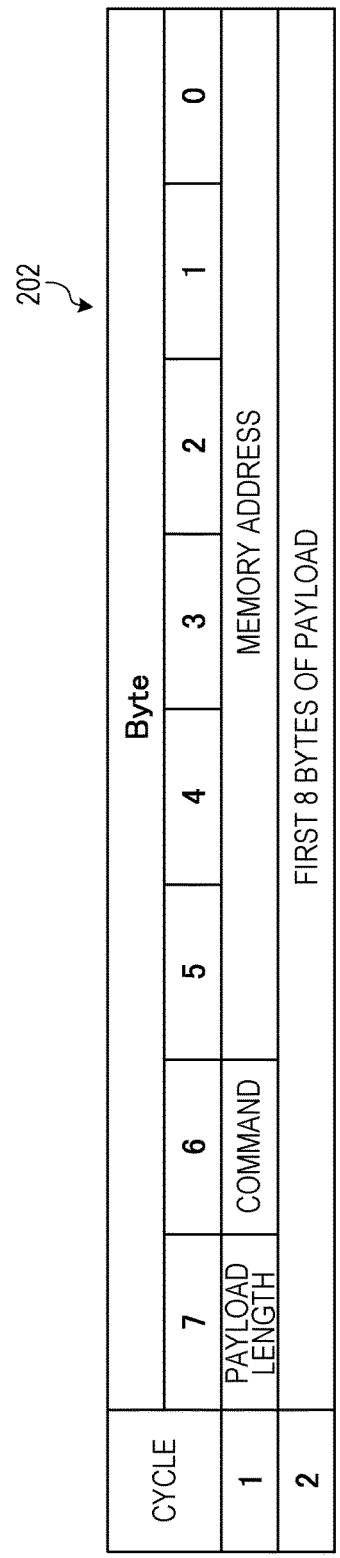
FIG. 7 is a diagram illustrating an example of a format of start data that is passed from a header transfer unit to a header control unit.

Thereafter, the header transfer unit 143 outputs start data 202 illustrated in FIG. 7 including the read header and the read payload start portion, which is the first 8 bytes of the payload, to the header control unit 145. FIG. 7 is a diagram illustrating an example of the format of start data passed from a header transfer unit to a header control unit. As illustrated in FIG. 7, in the start data 202, a memory address, a command, and a payload length are in the first cycle. Also in the start data 202, a payload start portion, which is the first 8 bytes of the payload, is in the second cycle.

Until the header transfer unit 143 receives a header release instruction, which instructs the header transfer unit 143 to release an entry of the header address storage table 144, from the header control unit 145 after the start data 202 has been output to the header control unit 145, the header transfer unit 143 determines that the header control unit 145 is handling the header. Thereafter, upon receiving the header release instruction from the header control unit 145, the header transfer unit 143 releases an entry of the header address storage table 144 that corresponds to a header for which the notification has been issued.

For example, the header transfer unit 143 determines the handling state of the header by the header control unit 145 in a way as follows. Upon outputting the start data 202 to the header control unit 145, the header transfer unit 143 sets the header notification number to one. Then, upon receiving a header release instruction from the header control unit 145, the header transfer unit 143 returns the header notification number to zero. Then, if there remains a header the notification of which has not been issued, the header transfer unit 143 acquires the start data 202 from the packet buffer 142 and outputs the start data 202 to the header control unit 145. That is, if the header notification number is zero, the header transfer unit 143 determines that the header control unit 145 is not handling the header, whereas if the header notification number is one, the header transfer unit 143 determines that the header control unit 145 is handling the header. In such a way, after handling of a packet has finished, the header transfer unit 143 transmits the next packet to the header control unit 145. As a result, after completing handling of a specific packet, the header control unit 145 handles the subsequent packet.

Although the length of a payload start portion is 8 bytes in the present embodiment, there are no restrictions on the size of the payload start portion. Lengthening the payload start portion may reduce the number of accesses to the packet buffer 142 and may more improve the reduction in latency, as described hereinbelow. However, if the start portion of a payload is lengthened, it takes a longer time to read the start data 202 and store the start data 202 in the header buffer 146. Accordingly, it is desirable to determine the length of a payload start portion in accordance with the operations in consideration of the balance between improvement in probability of latency reduction and the delay in the time taken to read and write the start data 202. The payload start portion corresponds to an example of a beginning portion of a given length from the beginning of data.

The header buffer 146 is a buffer with a low latency that is composed of a flip flop and so on. In the header buffer 146, data is stored and read by the header control unit 145. The header buffer 146 corresponds to an example of a header storage unit.

Figure 8:
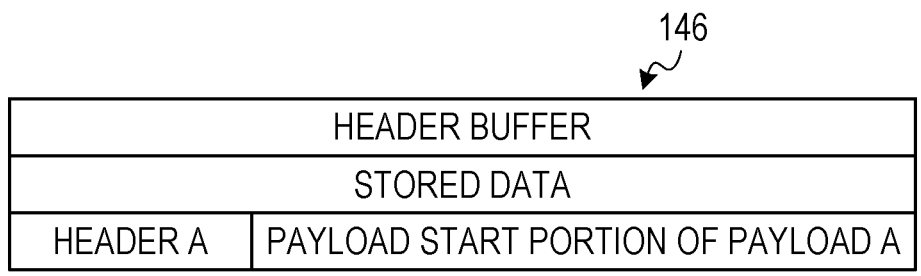
FIG. 8 is a diagram illustrating an example of a data storage state of a header buffer.

The header control unit 145 receives the start data 202 including the header and the payload start portion from the header transfer unit 143. The header control unit 145 stores the header and the payload included in the start data 202 in the header buffer 146 as illustrated in FIG. 8. FIG. 8 is a diagram illustrating an example of a data storage state of a header buffer. By way of example, in the case where data is stored in the packet buffer 142 as illustrated in FIG. 5, FIG. 8 illustrates a state where the start data 202 of the data A is acquired and is stored in the header buffer 146 by the header control unit 145. In this case, the header control unit 145 acquires the start data 202 including the header A and the payload start portion of the payload A, which is included together with the header A in the data A. The header control unit 145 then stores the header A and the payload start portion of the payload A in association with each other in the header buffer 146.

Next, the header control unit 145 adds an address corresponding to the header to the read address, which is an address for reading the header, to calculate a payload read address, which is an address for reading the payload. In the present embodiment, the size of a header corresponds to an area represented by one address, and therefore the header control unit 145 adds one to the read address to generate a payload read address.

Next, the header control unit 145 analyzes the header stored in the header buffer 146 and acquires the size of data to be transferred by DMA. The header control unit 145 then determines whether the size of data to be transferred by DMA is less than or equal to the size of the payload start portion.

Figure 9:
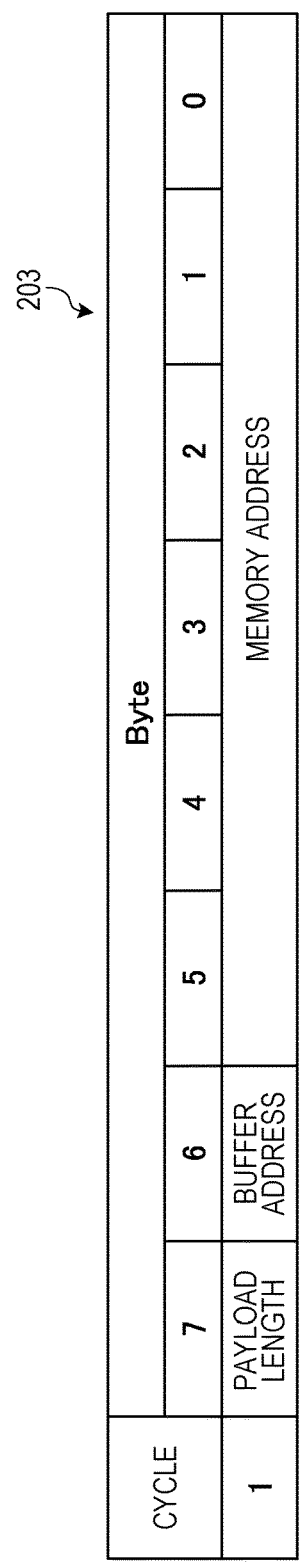
FIG. 9 is a diagram illustrating an example of a format of a payload transfer instruction.

If the size of data to be transferred by DMA is greater than the size of the payload start portion, the header control unit 145 outputs a payload transfer instruction 203, which is an instruction to transfer the payload, illustrated in FIG. 9 to the payload transfer unit 147. FIG. 9 is a diagram illustrating an example of a format of a payload transfer instruction. In the payload transfer instruction 203, as illustrated in FIG. 9, a memory address, a buffer address, and a payload length are contained. The buffer address corresponds to the first address of addresses for reading a payload from the packet buffer 142, and a payload read address is stored as the buffer address.

Thereafter, the header control unit 145 receives notification of completion of memory access from the memory controller 13. The header control unit 145 then outputs a header release instruction to the header transfer unit 143. The header control unit 145 also outputs notification of completion of data transfer by DMA to the CPU core 11.

However, if the size of data to be transferred by DMA is less than or equal to the size of the payload start portion, the header control unit 145 outputs the payload stored in the header buffer 146 to the DMA control unit 148 to cause the DMA control unit 148 to transfer the data by DMA.

Figure 10:
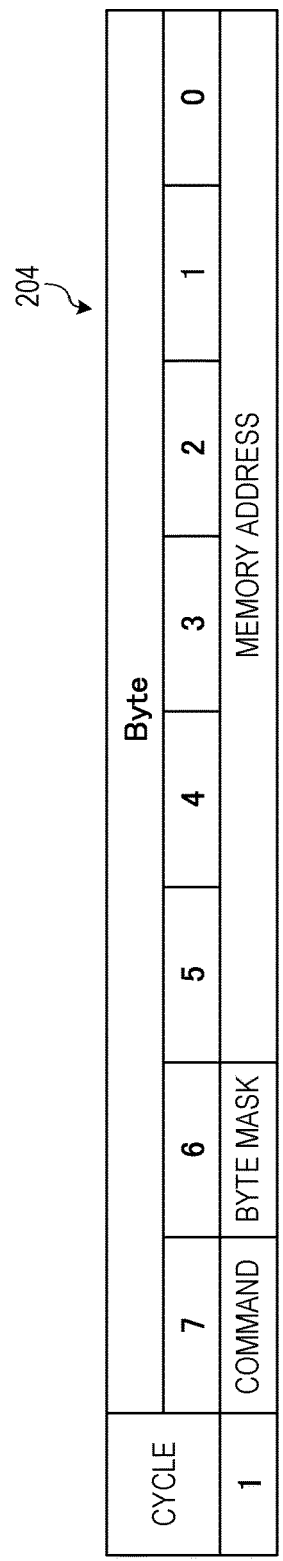
FIG. 10 is a diagram illustrating an example of a format of a command bus block.
Figure 11:
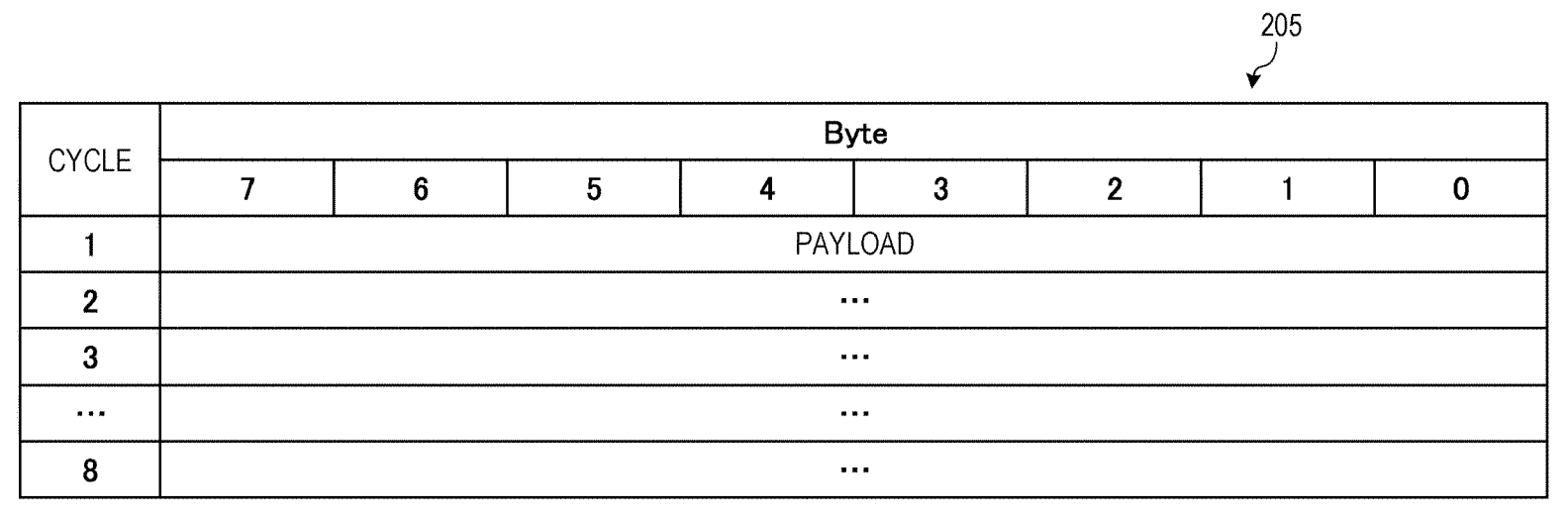

The format of a request for DMA to the memory controller 13 is divided into two formats, a format of a command bus block 204 and a format of a data bus block 205 illustrated in FIG. 10 and FIG. 11. FIG. 10 is a diagram illustrating an example of a format of a command bus block. FIG. 11 is a diagram illustrating an example of a format of a data bus block.

In the command bus block 204, as illustrated in FIG. 10, a command, a byte mask, and a memory address are contained. The command is a command for performing a process of writing data read from the packet buffer 142 to the memory 12 by DMA. The byte mask is information for masking a location of a cache line at which data is not to be provided. As the memory address, the first physical address of physical addresses to which access is to be made is contained.

In the data bus block 205, as illustrated in FIG. 11, a payload is contained in a manner such that the maximum size of the contained payload corresponds to a memory access unit. In the present embodiment, the memory access unit is eight cycles, and therefore a payload is contained such that the maximum amount of the contained payload corresponds to the size of data transferred in eight cycles.

Transfer of a payload by the header control unit 145 will now be specifically described by using the command bus block 204 and the data bus block 205. The header control unit 145 calculates a byte mask in the header buffer 146 from the memory address and the payload length in the header buffer 146, in which the start data 202 is stored, and generates the command bus block 204. The header control unit 145 outputs the generated command bus block 204 to the DMA control unit 148. Next, the header control unit 145 reads the payload from the header buffer 146, generates the data bus block 205, and outputs the data bus block 205 to the DMA control unit 148.

Thereafter, the header control unit 145 receives notification of completion of memory access from the memory controller 13. The header control unit 145 then outputs a header release instruction to the header transfer unit 143. The header control unit 145 also outputs notification of completion of data transfer by DMA to the CPU core 11.

If the size of data to be transferred by DMA is greater than the size of the payload start portion, the payload transfer unit 147 receives the payload transfer instruction 203 from the header control unit 145. The payload transfer unit 147 acquires the payload read address and the length of a payload stored in the packet buffer 142 from the payload transfer instruction 203.

The payload transfer unit 147 calculates a byte mask in the packet buffer 142 from the acquired payload read address and the payload length and generates the command bus block 204. The payload transfer unit 147 then outputs the generated command bus block 204 to the DMA control unit 148.

Thereafter, the payload transfer unit 147 reads a payload, generates the data bus block 205, and outputs the data bus block 205 to the DMA control unit 148. For example, if a payload greater than or equal to data corresponding to a memory access unit remains without being transferred to the DMA control unit 148, the payload transfer unit 147 reads the payload in an amount corresponding to the memory access unit. Upon completion of reading the payload in the amount corresponding to the memory access unit, the payload transfer unit 147 generates the data bus block 205 by using the read payload corresponding to the memory access unit and outputs the generated data bus block 205 to the DMA control unit 148. If a payload less than data corresponding to the memory access unit has not been transferred to the DMA control unit 148, the payload transfer unit 147 reads the remaining payload, generates the data bus block 205, and outputs the generated data bus block 205 to the DMA control unit 148.

If, after the data bus block 205 has been output, a payload remains without being transferred to the DMA control unit 148, the payload transfer unit 147 generates the next command bus block 204 and transmits the generated command bus block 204 to the DMA control unit 148, such that payload transfer using the data bus block 205 is repeated. When the size of the transferred payload reaches the length of the payload stored in the packet buffer 142, the payload transfer unit 147 completes transferring the payload. The payload transfer unit 147 corresponds to an example of a transmitting unit.

If the size of data to be transferred by DMA is less than or equal to the size of the payload start portion, the DMA control unit 148 receives the command bus block 204 and the data bus block 205 from the header control unit 145. The DMA control unit 148 instructs the memory controller 13 to write the payload transmitted by using the data bus block 205 to a memory address contained in the command bus block 204 by using a byte mask contained in the command bus block 204.

If the size of data to be transferred by DMA is greater than the size of the payload start portion, the DMA control unit 148 receives the command bus block 204 and the data bus block 205 from the payload transfer unit 147. The DMA control unit 148 receives the command bus block 204 and the data bus block 205 in each memory access unit until reading of all the payloads is complete. The DMA control unit 148 instructs the memory controller 13 to write the payload transmitted by using the data bus block 205 to a memory address contained in the command bus block 204 by using a byte mask contained in the command bus block 204.

Figure 12:
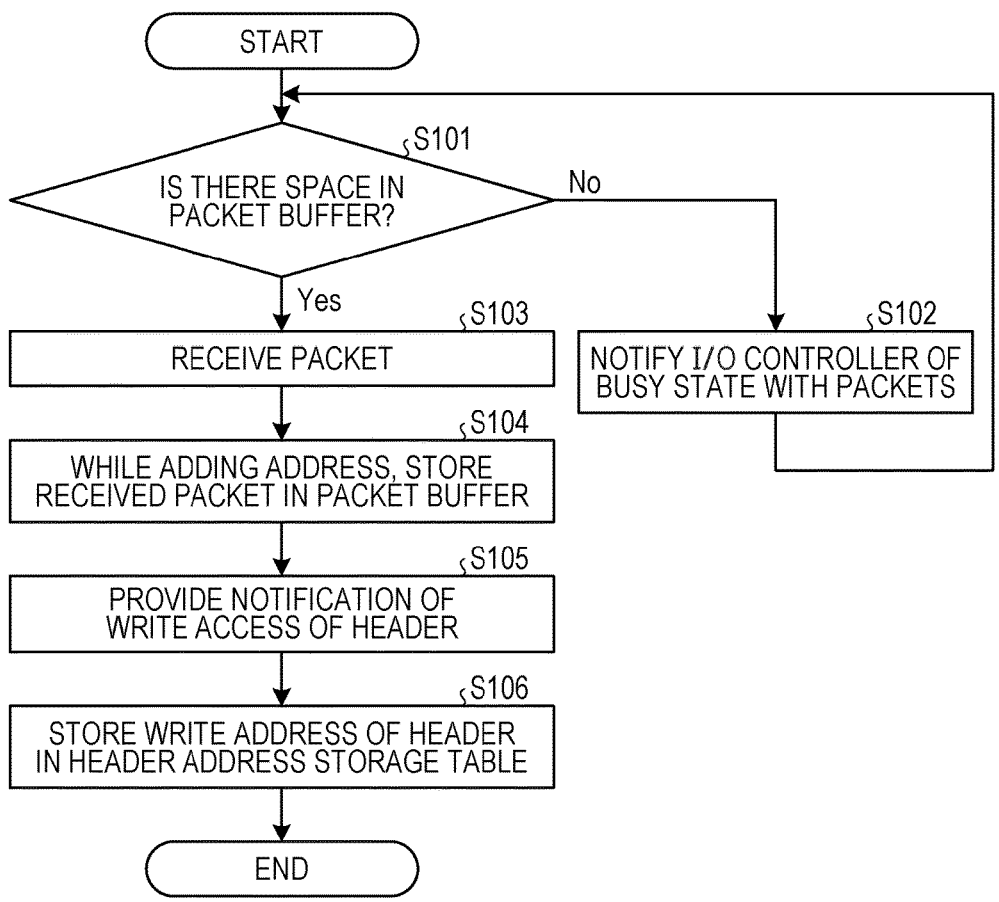
FIG. 12 is a flowchart of a process of packet storage in a packet buffer performed by a write control unit.

Next, with reference to FIG. 12, the flow of a process of packet storage to the packet buffer 142 by the write control unit 141 will be described.

The write control unit 141 verifies whether there is space in the packet buffer 142 (step S101). If there is no space in the packet buffer 142 (step S101: No), the write control unit 141 notifies the I/O controller 15 that the packet buffer 142 is busy with packets (step S102) and then returns to step S101.

However, if there is space in the packet buffer 142 (step S101: Yes), the write control unit 141 receives a packet from the I/O controller 15 (step S103).

Next, the write control unit 141 begins writing from a stored write address, and while adding an address at each writing, the write control unit 141 stores the received packet in the packet buffer 142 (step S104). At completion, the write control unit 141 holds a write address for the beginning of the next packet.

Next, the write control unit 141 identifies the write address for the header of the stored packet. The write control unit 141 notifies the header transfer unit 143 of the write address for the header of the stored packet (step S105).

Next, the write control unit 141 stores the write address for the header, of which the header transfer unit 143 is notified, in the header address storage table 144 (step S106).

Figure 13:
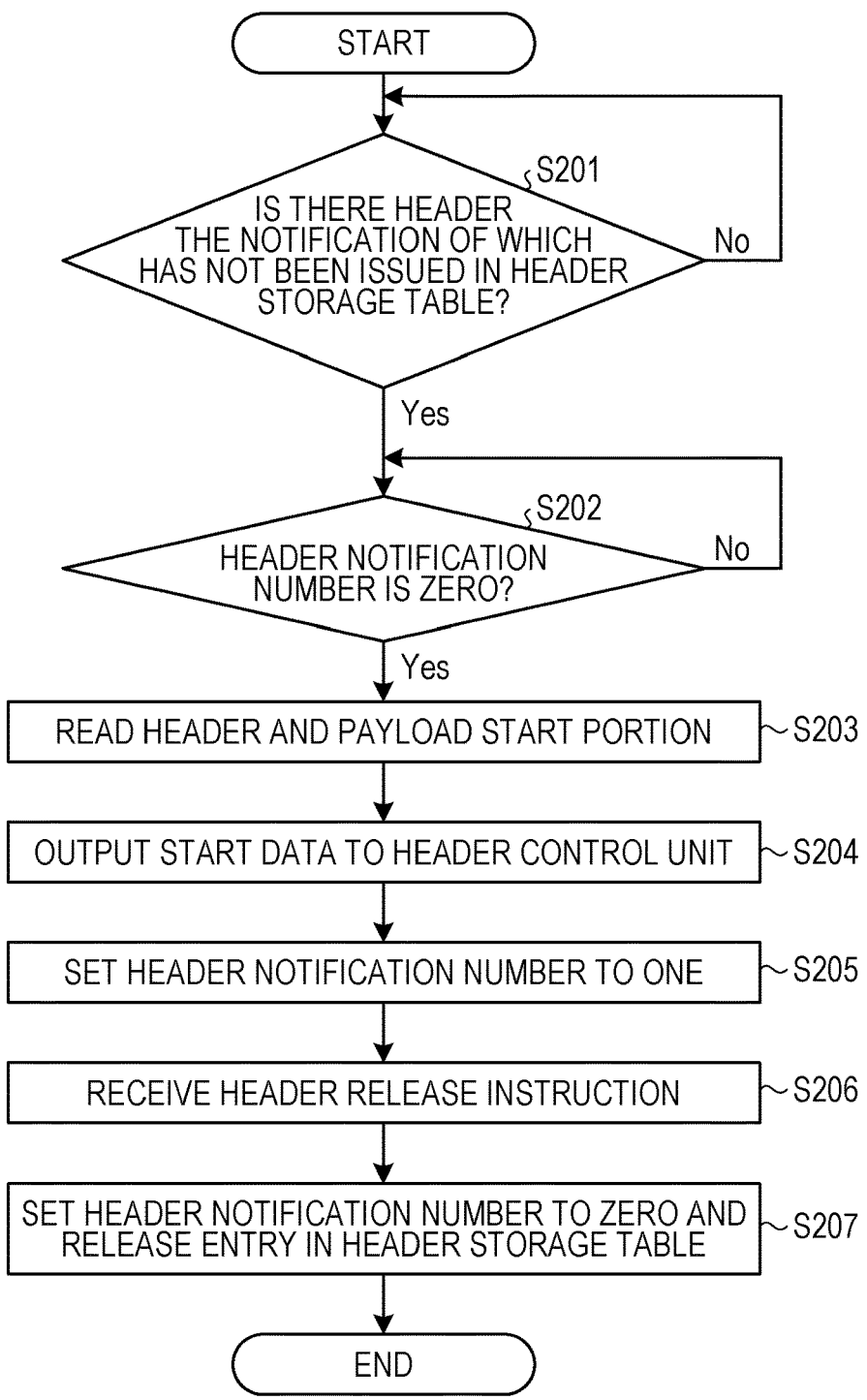
FIG. 13 is a flowchart of a header transfer process performed by a header transfer unit.

Next, with reference to FIG. 13, the flow of a header transfer process performed by the header transfer unit 143 will be described.

The header transfer unit 143 determines whether there is a header of which the header control unit 145 has not been notified, in the header address storage table 144 (step S201). If there is no header of which the header control unit 145 has not been notified (step S201: No), the header transfer unit 143 waits until a header of which the header control unit 145 has not been notified is stored in the header address storage table 144.

However, if there is a header of which the header control unit 145 has not been notified, in the header address storage table 144 (step S201: Yes), the header transfer unit 143 determines whether the header notification number is zero (step S202). If the header notification number is one (step S202: No), the header transfer unit 143 waits until the header notification number becomes zero.

However, if the header notification number is zero (step S202: Yes), the header transfer unit 143 reads a header and a payload start portion from the packet buffer 142 by using an address stored in the header address storage table 144 (step S203).

The header transfer unit 143 outputs the start data 202 including the read header and payload start portion to the header control unit 145 (step S204).

Next, the header transfer unit 143 sets the header notification number to one (step S205).

Thereafter, the header transfer unit 143 receives a header release instruction from the header control unit 145 (step S206).

The header control unit 145 then sets the header notification number to zero and further releases the entry in the header address storage table 144 (step S207).

Figure 14:
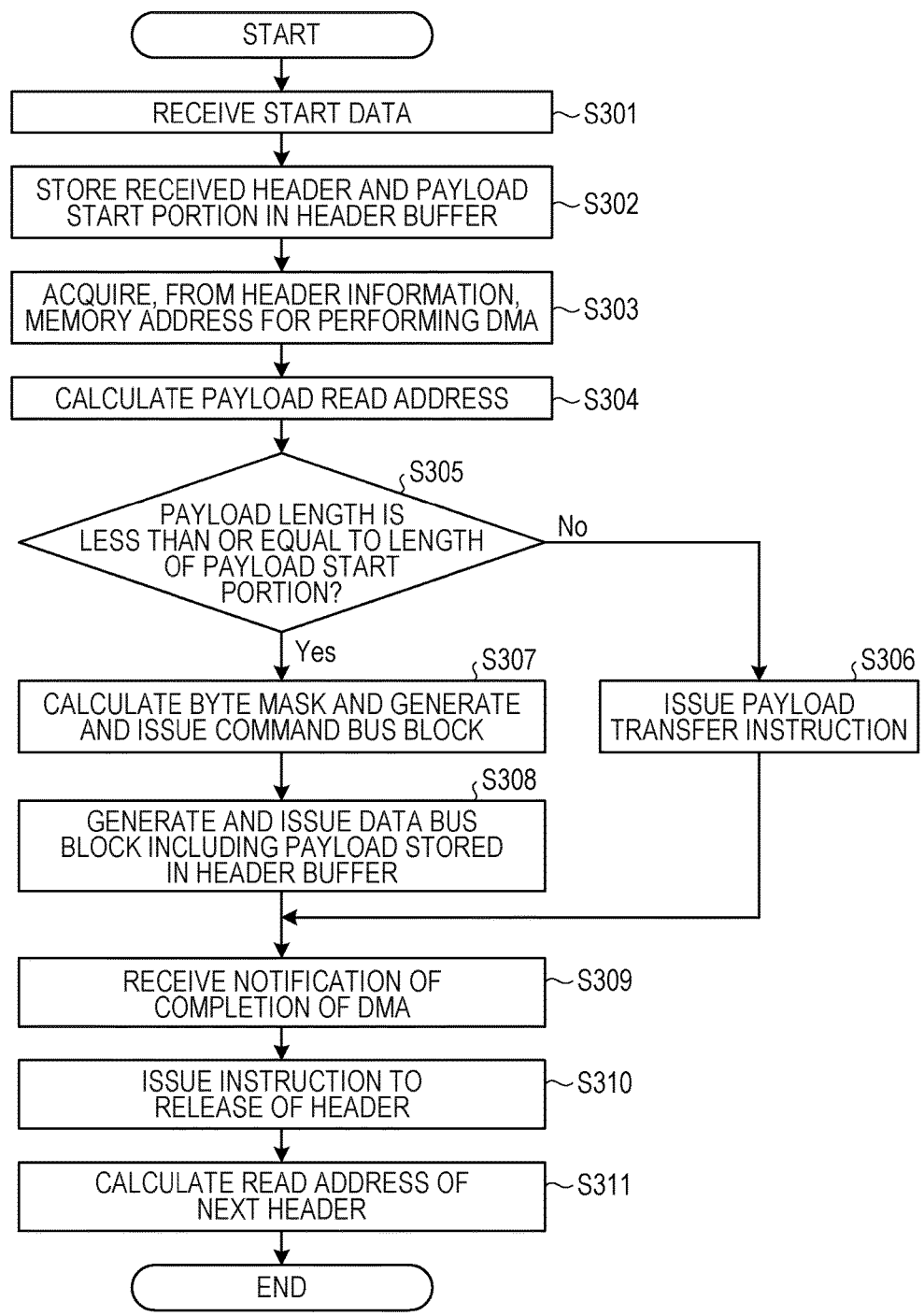
FIG. 14 is a flowchart of a header control process performed by a header control unit.

Next, with reference to FIG. 14, the flow of a header control process performed by the header control unit 145 will be described.

The header control unit 145 receives the start data 202 from the header transfer unit 143 (step S301).

Next, the header control unit 145 stores, in the header buffer 146, a header and a payload start portion included in the received start data 202 (step S302).

Next, the header control unit 145 acquires, from the header information, a memory address for performing DMA (step S303).

Next, the header control unit 145 calculates a payload read address, which is an address to read a payload, by adding an address for the header to the read address of the packet buffer 142 (step S304).

Next, the header control unit 145 determines whether the payload length is less than or equal to the length of the payload start portion (step S305). If the payload length is longer than the payload start portion (step S305: No), the header control unit 145 issues the payload transfer instruction 203 including a payload read address to the payload transfer unit 147 (step S306). A description of the payload transfer process is provided below with respect to FIG. 15.

However, if the payload length is less than or equal to the length of the payload start portion (step S305: Yes), the header control unit 145 calculates a byte mask from the memory address and the data length in the header buffer 146, generates the command bus block 204, and issues the command bus block 204 to the DMA control unit 148 (step S307).

Next, the header control unit 145 generates the data bus block 205 including a payload stored in the header buffer 146 and issues the data bus block 205 to the DMA control unit 148 (step S308).

Thereafter, the header control unit 145 receives notification of completion of DMA from the memory controller 13 (step S309).

Next, the header control unit 145 instructs the header transfer unit 143 to release the header (step S310).

Next, the header control unit 145 adds the payload length to the payload read address to calculate the read address of the next header (step S311).

Figure 15:
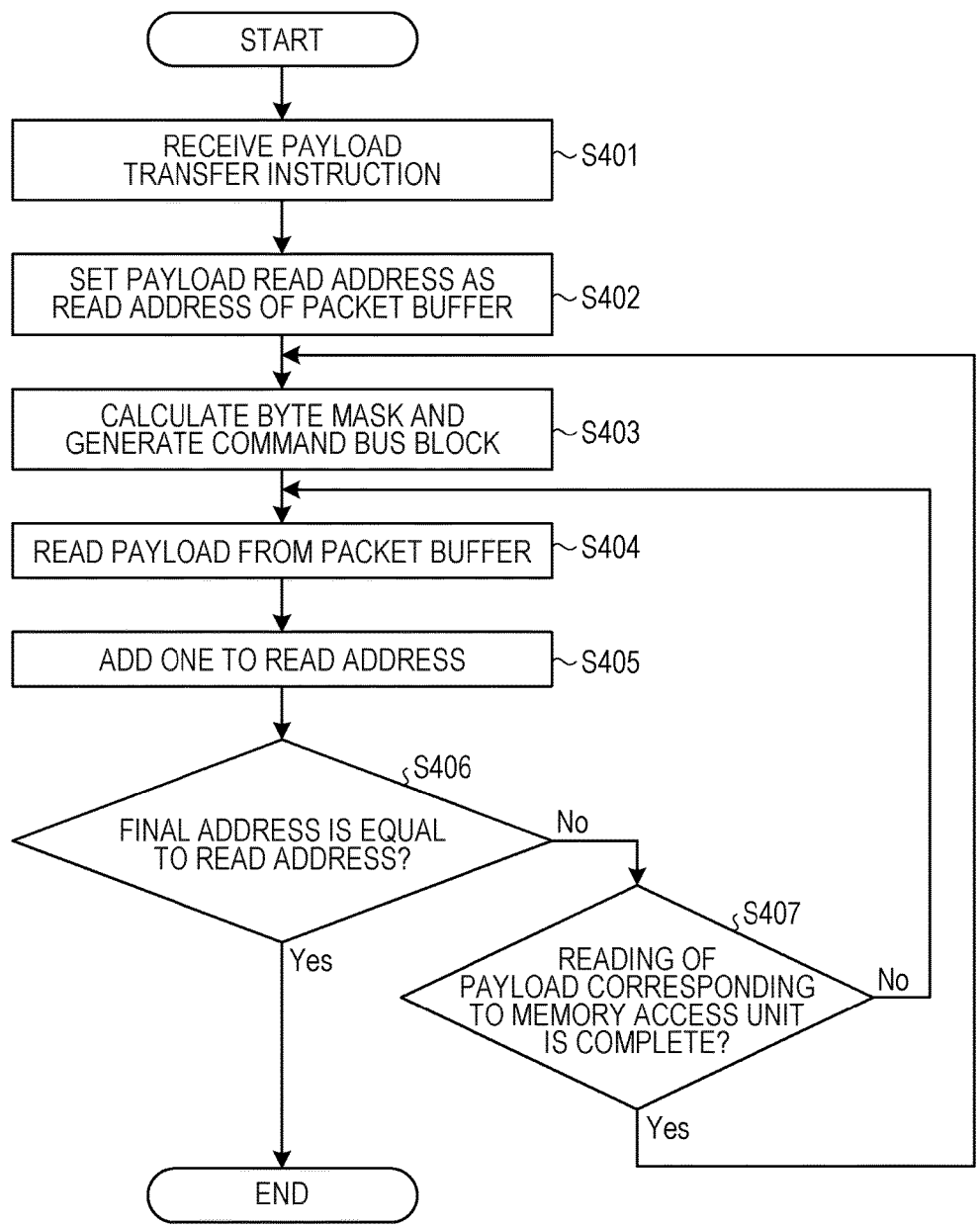
FIG. 15 is a flowchart of a payload transfer process performed by a payload transfer unit.

Next, with reference to FIG. 15, the flow of a payload transfer process performed by the payload transfer unit 147 will be described.

The payload transfer unit 147 receives the payload transfer instruction 203 from the header control unit 145 (step S401).

Next, the payload transfer unit 147 sets a payload read address specified with the payload transfer instruction 203 as a read address of the packet buffer 142 (step S402).

Next, the payload transfer unit 147 calculates a byte mask from the memory address and the data length specified in the payload transfer instruction 203 and generates the command bus block 204 (step S403).

Next, the payload transfer unit 147 reads a payload from the read address of the packet buffer 142 (step S404).

Next, the payload transfer unit 147 adds one to the read address (step S405).

Next, the payload transfer unit 147 calculates a final address in which the payload length is added to the specified payload read address. The payload transfer unit 147 determines whether the final address is equal to the read address (step S406).

The final address is not equal to the read address (step S406: No), the payload transfer unit 147 determines whether reading of a payload corresponding to a memory access unit is complete (step S407). If reading of a payload corresponding to a memory access unit is not complete (step S407: No), the payload transfer unit 147 returns to step S404. However, if the reading of a payload corresponding to a memory access unit is complete (step S407: Yes), the payload transfer unit 147 returns to step S403.

Meanwhile, if the final address is equal to the read address (step S406: Yes), the payload transfer unit 147 completes the payload transfer process.

Figure 16:
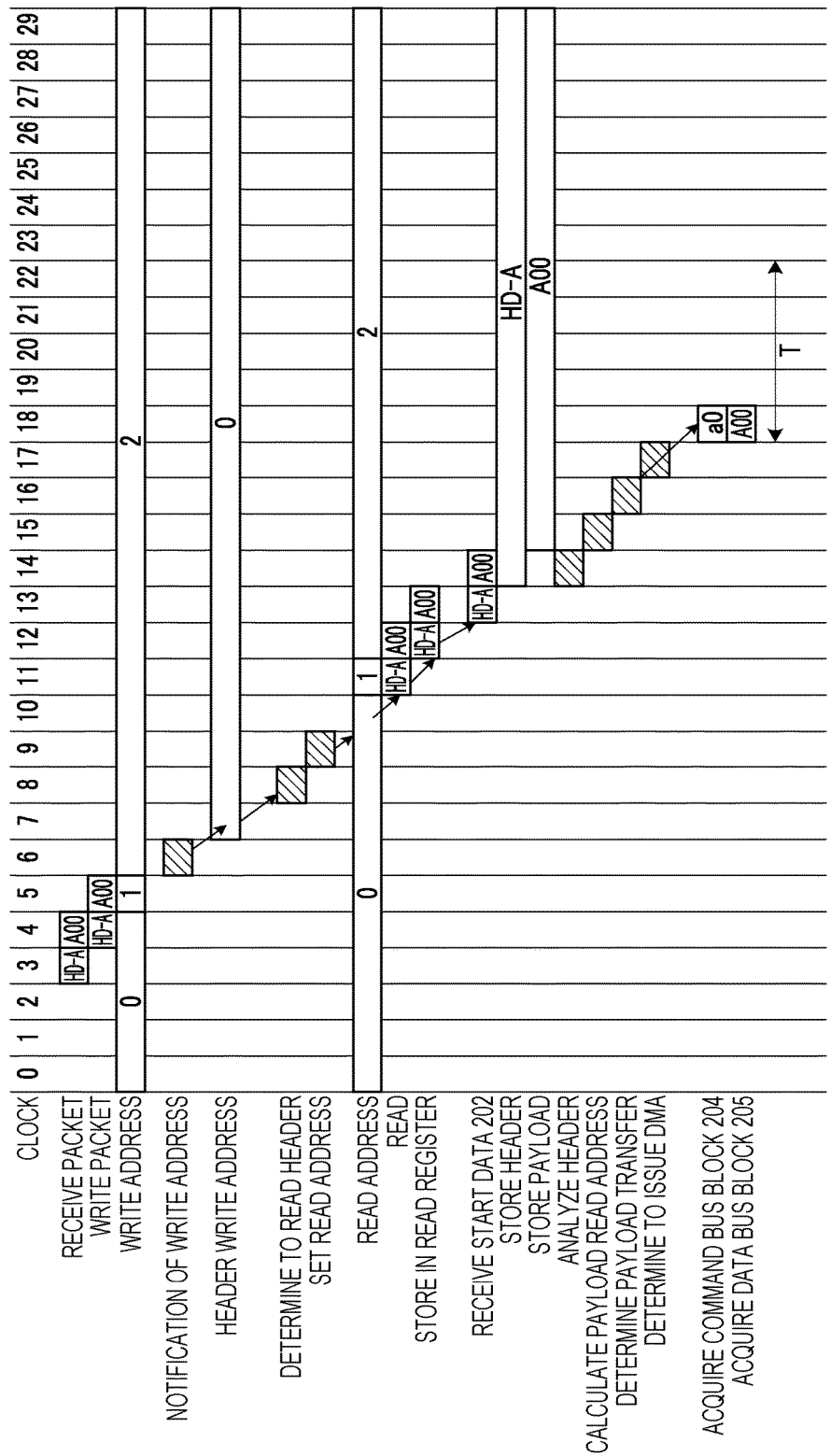
FIG. 16 is a time chart illustrating payload transfer in the case where transfer from a header buffer is performed.
Figure 17:
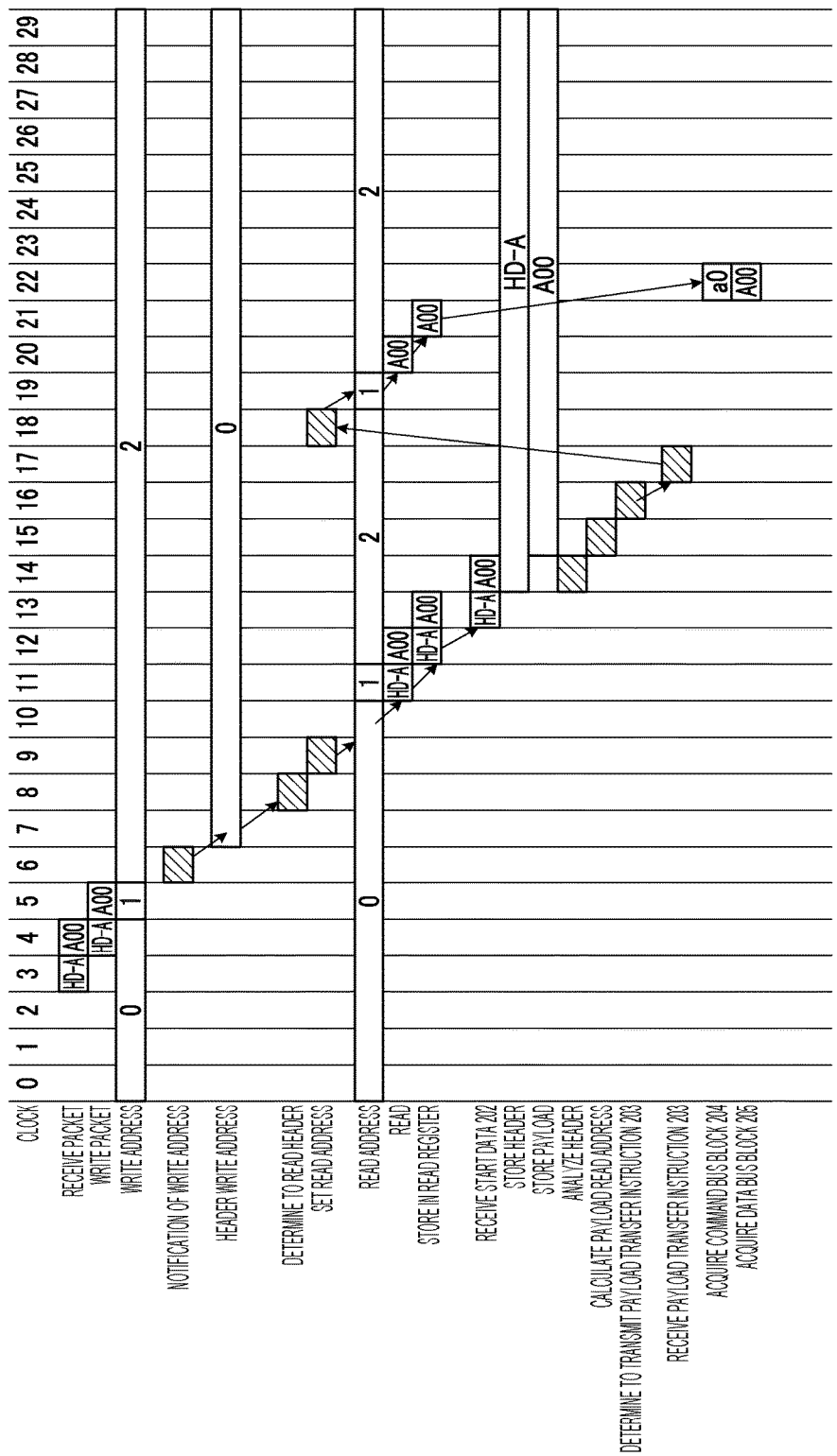
FIG. 17 is a time chart illustrating payload transfer in the case where transfer from a header buffer is not performed.

Furthermore, with reference to FIG. 16 and FIG. 17, the case where a payload is transferred from the header buffer 146 and the case where a payload is not transferred from the header buffer 146 are compared. FIG. 16 is a time chart illustrating payload transfer in the case where transfer from a header buffer is performed. FIG. 17 is a time chart illustrating payload transfer in the case where transfer from a header buffer is not performed.

In FIG. 16 and FIG. 17, the horizontal axis represents the number of clocks. In FIG. 16 and FIG. 17, descriptions on the left hand of the figure represent the processing details performed and addresses used in each stage of the time chart. Descriptions are given here of the case where a packet A including the header A and the payload A is received by DMA. The payload A has a size that is less than or equal to the size of data transferred in one cycle and that is shorter than the payload start portion. In FIG. 16 and FIG. 17, the header A is denoted by HD-A, and the payload A is denoted by A00.

With reference to FIG. 16, the flow of processing in the case where transfer of a payload from the header buffer 146 is performed will be described. The write control unit 141 initially possesses zero as the write address in the packet buffer 142. In the third clock, the write control unit 141 receives the header A. In the fourth clock, the write control unit 141 receives the payload A and writes the header A in an area in the packet buffer 142 corresponding to the write address, and increments the write address by one. In the fifth clock, the write control unit 141 writes the payload A in an area in the packet buffer 142 corresponding to the write address, and increments the write address by one. In the sixth clock, the write control unit 141 notifies the header transfer unit 143 of the header write address. In the seventh clock, the write control unit 141 stores the notified header write address in the header address storage table 144. Thereby, zero is stored as the header write address in the header address storage table 144.

In the sixth clock, the header transfer unit 143 receives the notification of the header write address from the write control unit 141. In the seventh clock, the header transfer unit 143 verifies that the header A the notification of which has not been issued is present in the header address storage table 144. Since the header A the notification of which has not been issued is present, in the eighth clock, the header transfer unit 143 determines to read the header of the packet A. In the ninth clock, the header transfer unit 143 acquires a header write address from the header address storage table 144 and sets the acquired address as a read address for the packet buffer 142. In the tenth clock, the header transfer unit 143 instructs the packet buffer 142 to perform reading from an area of the packet buffer 142 corresponding to the set read address. In the eleventh clock, the header transfer unit 143 acquires the header A from the area of the packet buffer 142 corresponding to the read address and increments the read address by one. In the twelfth clock, the header transfer unit 143 stores the read header A in a read register, acquires the payload A from the area of the packet buffer 142 corresponding to the read address, and increments the read address by one. In the thirteenth clock, the header transfer unit 143 transmits the header A stored in the read register to the header control unit 145 and stores the read payload A in the read register. In the fourteenth clock, the header transfer unit 143 transmits the payload A stored in the read register to the header control unit 145.

The header control unit 145, in the thirteenth clock, receives the header A of the start data 202 and transmits the header A to the header buffer 146 and, in the fourteenth clock, receives the payload A of the start data 202 and transmits the payload A to the header buffer 146. In the fourteenth and subsequent clocks, the header A is stored in the header buffer 146. In the fifteenth and subsequent clocks, the payload A is stored in the header buffer 146. In the fourteenth clock, the header control unit 145 analyzes the header A stored in the header buffer 146. In the fifteenth clock, the header control unit 145 calculates a payload read address. in the sixteenth clock, the header control unit 145 confirms that the length of the payload A is less than or equal to the length of the payload start portion, determines to perform payload transfer by itself, and, in the seventeenth clock, determines to issue a DMA command.

In the eighteenth clock, the DMA control unit 148 acquires the command bus block 204 including the header A and the data bus block 205 including the payload A. Thereafter, the DMA control unit 148 uses the acquired command bus block 204 and the data bus block 205 to store the header A and the payload A in the memory 12 by DMA.

Next, with reference to FIG. 17, the flow of processing in the case where transfer of a payload from the header buffer 146 is not performed will be described. Description is given here assuming that the DMA controller 14 according to the present embodiment transfers a payload from the packet buffer 142 even when the payload length is less than or equal to the length of a payload start portion. Up to the fifteenth clock, the write control unit 141, the header transfer unit 143, and the header control unit 145 perform operations as described above. In the sixteenth clock, although the length of the payload A is less than or equal to the length of the payload start portion, the header control unit 145 determines to cause the payload transfer unit 147 to perform payload transfer.

In the seventeenth clock, the payload transfer unit 147 receives the payload transfer instruction 203 transmitted from the header control unit 145. In the eighteenth clock, the payload transfer unit 147 sets one, which is the payload read address specified in the payload transfer instruction 203, as a read address. In the nineteenth clock, the payload transfer unit 147 instructs the packet buffer 142 to perform reading from an area of the packet buffer 142 corresponding to the set read address. In the twentieth clock, the payload transfer unit 147 acquires the payload A from the area of the packet buffer 142 corresponding to the read address and increments the read address by one. Thereafter, the payload transfer unit 147 generates the command bus block 204 and the data bus block 205 and outputs the command bus block 204 and the data bus block 205 to the DMA control unit 148.

In the eighteenth clock, the DMA control unit 148 acquires the command bus block 204 including the header A and the data bus block 205 including the payload A from the payload transfer unit 147. Thereafter, the DMA control unit 148 uses the acquired command bus block 204 and data bus block 205 to store the header A and the payload A in the memory 12 by DMA.

When the flow of processing in FIG. 16 is compared with the flow of processing in FIG. 17, the processing in FIG. 16 enables the latency to be reduced by time T illustrated in FIG. 16 compared with the processing in FIG. 17. In existing data transfer by DMA, as in the case illustrated in FIG. 17, the packet buffer 142 is accessed twice and data is read. That is, the DMA controller 14 according to the present embodiment may reduce the latency compared with the existing DMA controller.

As described above, for a payload whose length is small, such as an SMS message, a DMA controller according to the present embodiment may achieve payload transfer with a single access to the packet buffer. Accordingly, a DMA controller according to the present embodiment may reduce the latency for a payload whose length is small, compared with the existing DMA controller. Other examples of the message whose payload is short include a message for handshaking of information used for establishment of communication and a message for multiple times of short access issued by a program that performs discontinuous memory access.

That is, when processing of large-scale data is performed in data transfer by DMA, a DMA controller according to the present embodiment reads a payload from a high-density buffer and thus may improve the throughput performance. In addition, when processing of short data is performed in data transfer by DMA, a DMA controller according to the present embodiment reduces access to a high-density buffer and thus may achieve low latency in memory access.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
   a first memory; and
   a direct memory access (DMA) controller coupled to the first memory and configured to receive a packet including a header where information for DMA is registered and data to be stored in the first memory, the DMA controller including a second memory to store the received packet and a third memory, wherein
   the DMA controller is configured to:
     acquire and store, in the third memory, the header and a beginning portion of a given length from beginning of the data of the packet stored in the second memory,
     read the data included in the packet from the third memory when it is determined, based on the header, that a data length of the data included in the packet is less than or equal to the given length, and
     perform storage of the read data by DMA in the first memory.

2. The information processing apparatus according to claim 1, wherein:
   the DMA controller is further configured to,
     upon receiving an instruction to read the data included in the packet from the second memory, read the data of the packet from the second memory when the data length is longer than the given length, and perform storage of the read data by DMA in the first memory.

3. The information processing apparatus according to claim 2, wherein:

the DMA controller is configured to receive, after the packet, a subsequent packet including another header and other data;

the second memory is configured to store the packet and the subsequent packet; and after completion of reading the data included in the packet from the third memory or after performing an instruction to read the data included in the packet from the second memory, the DMA controller performs, for the subsequent packet, processing applied to the packet.

4. The information processing apparatus according to claim 1, wherein the DMA controller is further configured to acquire and store, in the third memory, together with the header, a beginning portion corresponding to a length of one cycle from the beginning of the data included in the packet.

5. The information processing apparatus according to claim 1, wherein:

the second memory is a high-density storage device; and the third memory is a storage device having a low latency compared with the second memory.

6. The information processing apparatus according to claim 1, further comprising an input/output (I/O) controller and a memory controller, wherein the DMA controller is configured to:

receive the packet from the I/O controller, and instruct the memory controller to store the data in the first memory.

7. An information processing system comprising:

a plurality of information processing apparatuses each including:

a first memory;

a direct memory access (DMA) controller coupled to the first memory and configured to receive a packet including a header where information for DMA is registered and data to be stored in the first memory, the DMA controller including a second memory to store the received packet and a third memory, wherein the DMA controller is configured to:

acquire and store, in the third memory, the header and a beginning portion of a given length from beginning of the data of the packet stored in the second memory, read the data included in the packet from the third memory when it is determined, based on the header, that a data length of the data included in the packet is less than or equal to the given length, and perform storage of the read data by DMA in the first memory.

8. A method performed by an information processing apparatus including a first memory, a second memory, and a third memory, the method comprising:

receiving a packet including a header where information for a direct memory access (DMA) is registered and data to be stored in the first memory;

storing the received packet in the second memory;

acquiring and storing, in the third memory, the header and a beginning portion of a given length from beginning of the data of the packet stored in the second memory;

reading the data included in the packet from the third memory when it is determined, based on the header, that a data length of the data included in the packet is less than or equal to the given length; and performing storage of the read data by DMA in the first memory.

9. An information processing apparatus comprising:

a first memory; and a direct memory access (DMA) controller coupled to the first memory, the DMA controller includes a second memory and a third memory, wherein the DMA controller is configured to perform a read and store process including:

receiving a first packet, the first packet including a first header where information for DMA is registered and including first payload data, storing the first header and the first payload data of the first packet in the second memory, storing, in the third memory, the first header and a beginning portion of the first payload data to the third memory, the beginning portion of the first payload data equal to a given length of data starting from the beginning of the payload data, reading the beginning portion of the first payload data from the third memory when it is determined, based on the header, that a data length of the first payload data included in the first packet is less than or equal to the given length, reading the first payload data from the second memory when it is determined, based on the header, that the data length of the first payload data included in the first packet is greater than the given length, and storing the beginning portion of the first payload data from the third memory or the first payload data from the second memory in the first memory.

10. The information processing apparatus according to claim 2, wherein the DMA controller is further configured to:

receive, after the first packet, a second packet that includes a second header and second payload data to be stored in the first memory;

perform the read and store process with respect to the second packet.

* * * * *